United States Patent [19]

Kühn

[11] Patent Number: 4,566,515

[45] Date of Patent: Jan. 28, 1986

[54] WHEEL AND SOLID TIRE ASSEMBLY HAVING LOCKING RING

[75] Inventor: Heinz Kühn, Waldeck, Fed. Rep. of Germany

[73] Assignee: Continental Gummi-Werke Aktiengesellschaft, Hanover, Fed. Rep. of Germany

[21] Appl. No.: 693,008

[22] Filed: Jan. 18, 1985

[30] Foreign Application Priority Data

Jan. 27, 1984 [DE] Fed. Rep. of Germany ....... 3402811

[51] Int. Cl.⁴ .................................................. B60C 7/24
[52] U.S. Cl. .................................... 152/402; 152/410; 152/323
[58] Field of Search ............... 152/396, 397, 323, 406, 152/410, 402, 409; 301/63 PW

[56] References Cited

FOREIGN PATENT DOCUMENTS 2617417 11/1977 Fed. Rep. of Germany ...... 152/323

*Primary Examiner*—David A. Scherbel
*Attorney, Agent, or Firm*—Becker & Becker, Inc.

[57] ABSTRACT

A wheel and tire assembly for a vehicle, including a solid rubber tire, and a wheel body, one or both edges of which are provided with a circumferential groove for receiving a retaining ring for the solid tire. In order to be able to repeatedly mount the solid tire with a sufficiently reliable seating, there is inventively proposed to provided the solid tire with a base having a width such that when the retaining ring is omitted, the tire extends slightly into the region which would otherwise be occupied by the retaining ring. Accordingly, when the retaining ring is inserted, the base of the tire must be slightly elastically deformed, thus assuring a secure seating of the tire on a wheel rim therewith.

5 Claims, 2 Drawing Figures

WHEEL AND SOLID TIRE ASSEMBLY HAVING LOCKING RING

BACKGROUND OF THE INVENTION

1. Field of the Invention

The present invention relates to a wheel and tire assembly for a vehicle. The assembly comprises a wheel body, and a solid tire comprising rubber or rubber-like sunthetic material. One, and possibly both, of the edges of the wheel body are provided with a circumferential groove for receiving a retaining ring for the solid tire. The solid tire is adapted to be mounted on the wheel body with such a tension that the solid tire can be fixed on the wheel body without retaining rings.

2. Description of the Prior Art

In order to be able to effect such a mounting of the aforementioned solid tire by means of a force fit, the base of the tire is made pull-resistant by disposing therein bundles of wire or the like.

Under certain conditions, for example for the purpose of retreading the tire, it becomes necessary to remove the solid tire from a rim thereof. After the tire is repaired or retreaded, the tire is reconnected with the wheel body via a force fit. However, when subjected to strong stresses, the retaining forces achieved by the force fit are now insufficient, primarily as a consequence of the tire having been removed, for example for the aforementioned retreading.

An object of the present invention is to provide a wheel and tire assembly of the aforementioned general type such that the solid tire can be remounted after having been removed, and in particular in such a way that this latter mounting also provides a sufficiently secure seating of the tire on a rim thereof.

BRIEF DESCRIPTION OF THE DRAWING

This object, and other objects and advantages of the present invention, will appear more clearly from the following specification in conjunction with the accompanying drawing, in which.

SUMMARY OF THE INVENTION

Figure 1:
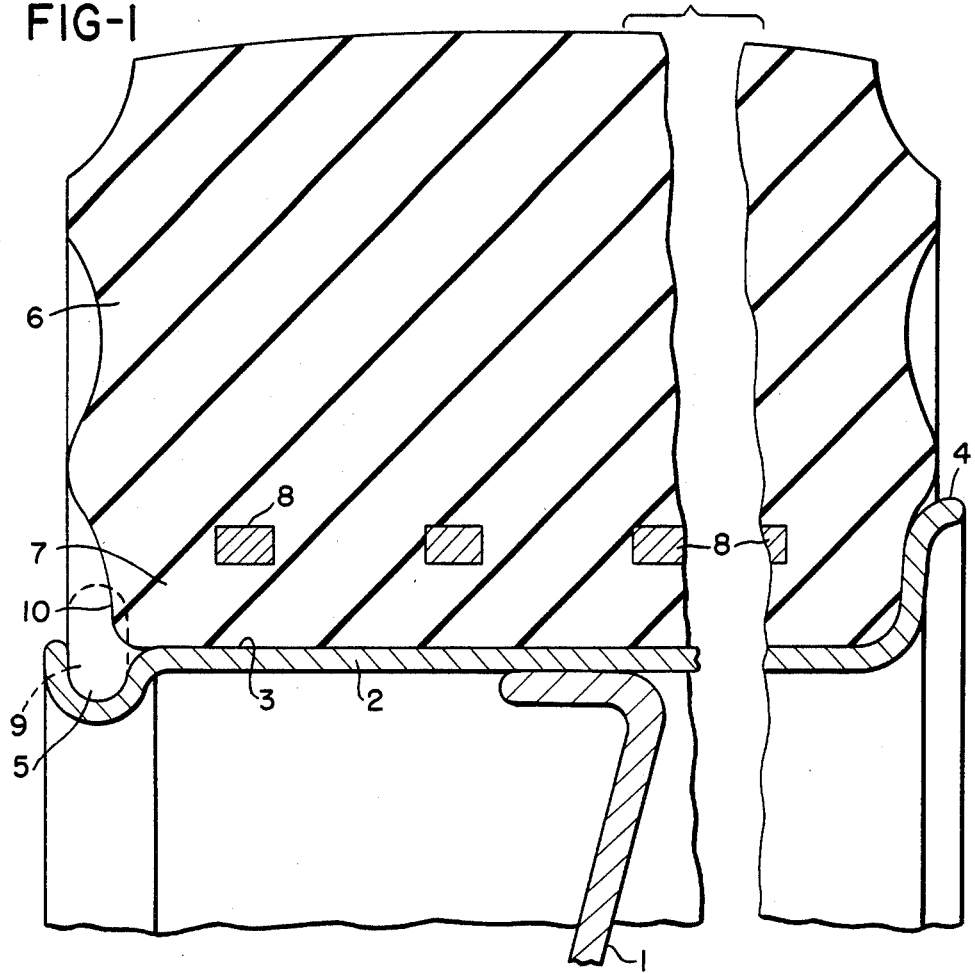
FIG. 1 is a partial radial section through one embodiment of the inventive wheel and tire assembly for a vehicle.

The wheel and tire assembly of the present invention is characterized primarily in that the solid tire has a base having such a width that when the retaining ring is omitted or is not in place, the tire extends slightly into the region which would otherwise be occupied by the retaining ring. In particular, the solid tire is dimensioned in such a way that, under these circumstances, the solid tire partially overlaps the groove which serves for receiving the retaining ring.

With a wheel and tire assembly of the inventive design, the solid tire is pressed onto the wheel body in the customary manner by a force fit while omitting the retaining ring or rings. If removal of the tire is necessary and then thereafter to remount the tire, the mounting thereof is effected in the customary manner, with the exception that, subsequent to the mounting, the retaining ring is disposed in a groove therewith. However, since pursuant to the present invention, the base of the tire extends slightly into the groove which is provided for receiving the retaining ring, the insertion of the retaining ring only can be effected by slightly elastically deforming the base of the tire, thus reducing the axial length of the latter. As a result, not only is the force fit improved, but the retaining ring is also clamped or wedged to such an extent that it can no longer become loose. Thus, the retaining rings can be introduced at a later stage, resulting in a fixing of the position not only of the tire body, but also of the rings themselves.

DESCRIPTION OF PREFERRED EMBODIMENTS

Referring now to the drawings in detail, the wheel body essentially comprises a well 1 which on its outer periphery supports a rim 2 which has a cylindrical seating surface 3. Located at one edge of the rim 2 is a flange 4, and located at the other edge is a circumferential groove 5.

The solid rubber tire which is mounted on the rim 2 has an elastically deformable cushion 6 at its outer periphery, and a base 7 of a harder rubber. A plurality of pull-resistant elements are distributed over the width of the base 7; these elements are in the form of wire sets 8.

Figure 2:
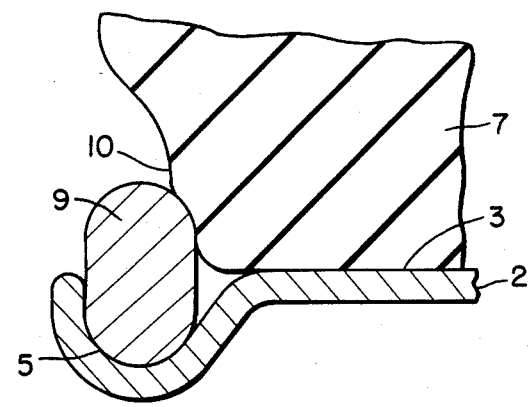
FIG. 2 is a radial partial section of a portion of the view of FIG. 1, showing the retaining ring in place.

As shown in FIG. 2, a retaining ring 9, for example in the nature of a snap ring, can be disposed in the circumferential groove 5.

In the wheel and tire assembly of FIG. 1, the retaining ring 9 is initially omitted. The force fit, with which the solid tire is mounted upon the rim 2, is reliable to such an extent that it precludes axial shifting of the solid tire. In this state, as shown in FIG. 1, the side surface 10 of the base 7 extends over approximately 25 to 50% of the width of the circumferential groove 5.

If it becomes necessary to remove, i.e. dismount, the solid tire, for example in order to retread the tire, the solid tire is first removed, and after the retreading remounted on the rim 2 again in the customary manner, yet with a difference that now the retaining ring 9 is used, accompanied by slight deformation of the base 7 of the tire. Use of the retaining ring 9 in this way increases the prestress with which the base 7 contacts the seating surface 3. At the same time, the retaining ring 9 is sandwiched in under the influence of the stress which is introduced into the base 7 of the tire. With regard to the wheel and tire assembly of FIG. 1, as well as that of FIG. 2, the prestress of the solid tire on the seating surface 3 (prestress viewed in the circumferential direction of the tire) is then approximately 0.5 to 5%, and preferably approximately 2%.

The present invention is, of course, in no way restricted to the specific disclosure of the specification and drawing, but also encompasses any modifications within the scope of the appended claims.

What I claim is:

1. A wheel and tire assembly for a vehicle, including a solid tire of rubber or rubber-like synthetic material, and a wheel body which has a rim with at least one edge thereof as well as a seating surface on which said tire can be mounted as well as optionally including a retaining ring therewith if necessary; said at least one edge of said rim being provided with a circumferential groove for selectively and subsequently receiving said retaining ring if necessary in a region over said circumferential groove for holding said tire; said tire being adapted to be mounted on said rim with such a tension that said solid tire can be secured on the latter via diameter prestressing of the material of the tire itself without said retaining ring;

the improvement therewith wherein said solid tire has a base with a predetermined diameter which is adapted to be seated on said rim seating surface, and which has a width of such a dimension that when said retaining ring is omitted, said tire base itself under tension exerted as to tire diameter extends slightly into the region located over said circumferential groove, which would otherwise be occupied by said retaining ring so that said solid tire is held by the width thereof under tension along with diameter prestressing securely positioned on said rim seating surface and securely positioned relative to said circumferential groove.

2. A wheel and tire assembly according to claim 1, in which, when said retaining ring is omitted, said tire base extends in a range over 25 to 50% of the width of said circumferential groove.

3. A wheel and tire assembly according to claim 1, in which said solid tire, when in the mounted state, is seated on said rim seating surface with a diameter pre-stressing in a range of 0.5 to 5%.

4. A wheel and tire assembly according to claim 3, in which said tire is seated on said rim seating surface specifically with a 2% diameter prestressing of 2%.

5. A wheel and tire assembly according to claim 1, in which said rim has two circumferential edges, one being in the form of a rim flange, and the other being in the form of said circumferential groove in said rim edge.

* * * * *